United States Patent [19]

DeMaine et al.

[11] 3,958,249

[45] May 18, 1976

[54] INK JET DROP GENERATOR

[75] Inventors: Frank J. DeMaine, Endwell; Robert E. Pelkie, Owego; Normand C. Smith, Endicott; Reinhold E. Tomek, Endwell, all of N.Y.

[73] Assignee: International Business Machines Corporation, Armonk, N.Y.

[22] Filed: Dec. 18, 1974

[21] Appl. No.: 534,039

[52] U.S. Cl. .......... 346/1; 239/4; 239/102; 346/75; 346/140 R

[51] Int. Cl.$^2$ .......... G01D 15/18

[58] Field of Search .......... 346/75, 140; 239/4, 239/102

[56] References Cited

UNITED STATES PATENTS

| | | | |
|---|---|---|---|
| 3,173,612 | 3/1965 | Boocher | 239/4 |
| 3,281,860 | 10/1966 | Adams et al. | 346/75 |
| 3,679,132 | 7/1972 | Vehe et al. | 239/4 |
| 3,739,393 | 6/1973 | Lyon et al. | 346/75 X |

*Primary Examiner*—Joseph W. Hartary
*Attorney, Agent, or Firm*—Kenneth P. Johnson

[57] ABSTRACT

Nozzle for creating perturbations in a pressurized liquid filament issuing from an orifice in the nozzle in which the perturbations are caused by varying the cross-section of the orifice to produce corresponding variations in the cross-section of the liquid filament and induce subsequent breakup of the filament into a succession of drops.

12 Claims, 5 Drawing Figures

INK JET DROP GENERATOR

BACKGROUND OF THE INVENTION

Ink jet printing, in which pressurized liquid streams are used, requires that the stream be broken up into a regular succession of drops of uniform spacing and size. This breakup is accomplished by creating a succession of perturbations or disturbances in the liquid filament as it issues from an orifice in a nozzle. In the past, perturbations have been created by modulating either the ink velocity or pressure within the chamber preceding the orifice.

Velocity modulation is generally brought about by connecting an electromechanical transducer (usually a piezoelectric crystal) structurally to the surface in which the exit orifice is mounted. Energization of the transducer causes the orifice surface to oscillate along the longitudinal axis of the issuing stream at the applied drive frequency which, in turn, creates inertially produced pressure perturbations of the ink in the region of the orifice. This perturbation initiates drop generation in the liquid filament issuing from the orifice. An example of this type of perturbation is shown in U.S. Pat. No. 3,512,172.

Pressure modulation is usually accomplished by locating an electromechanical transducer (again usually a piezoelectric crystal) either in the liquid chamber or surrounding the chamber. Energization of the transducer produces standing waves acting on the ink within the chamber to produce pressure perturbations on that ink. In the region of the nozzle orifice, these perturbations again initiate the formation of drops in the liquid filament issuing from the orifice. U.S. Pat. No. 3,281,860 illustrates pressure perturbation.

In each of these methods of modulation, reflected waves are difficult to control, requiring tight component tolerances and associated high cost. In addition, ink supply chambers are at times difficult to construct which would maintain the fidelity required between the chamber compliance and applied transducer signals. Also, the presence of air bubbles in the ink adversely affect compliance. A further difficulty is due to reflected waves within the supply chamber which cuases irregular modulation of the stream. These difficulties result in nonuniform drop spacing or size and permit the generating of an excessive number of satellite drops over the applied frequencies and signal amplitudes of the transducers.

SUMMARY OF THE INVENTION

It is accordingly a primary object of this invention to provide apparatus for modulating an ink jet stream in which perturbation of the stream or filament is produced by varying the cross-section of the stream at the nozzle orifice.

A further object of this invention is to provide apparatus for producing perturbations in a pressurized liquid stream issuing from a nozzle orifice by modulating the orifice opening to create corresponding changes in the cross-sectional dimensions of the stream issuing therefrom.

Yet a further object of this invention is to provide apparatus for producing perturbations of a stream issuing from a nozzle orifice to cause breakup of the stream into drops which is simpler to construct, requires less driving energy and is less sensitive to poor chamber compliance and extraneous pressure waves in the liquid supply chamber that tend to produce unwanted drops.

A still further object of this invention is to provide an improved method of creating perturbations in a liquid stream issuing from a nozzle orifice which is to modulate the cross-section of the orifice and, hence the cross-section of the stream at selected intervals.

The foregoing objects are attained in accordance with the invention by forcing liquid through a nozzle orifice to produce a fluid filament and repetitively stressing the orifice plate to produce deformation of the orifice cross-section and corresponding alteration of the filament cross-section. Deformation of the orifice may be accomplished by an annular device for applying radial forces or by means to apply opposite compressive forces. The element in which the orifice is made should, of course, possess a degree of elasticity to avoid permanent set.

The application of perturbing stresses at the orifice plate is more efficient and renders the issuing stream insensitive to poor ink cavity compliance and, for practical purposes, is insensitive to extraneous pressure waves within the supply cavity.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Figure 1:
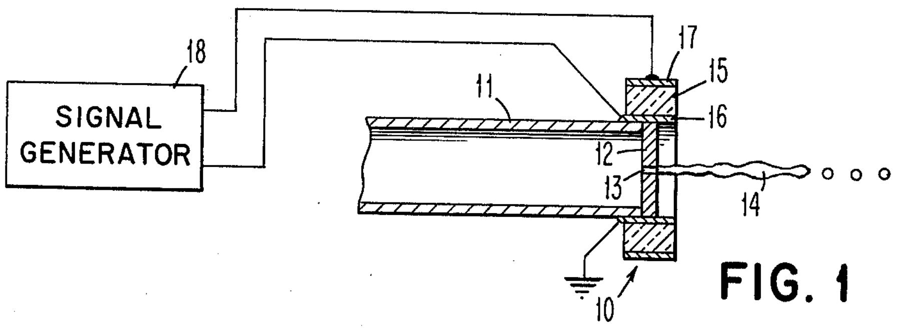
FIG. 1 is a sectional elevation view of a nozzle constructed in accordance with the principles of the invention.

Referring to FIG. 1, there is shown a nozzle assembly 10, in accordance with the invention, which comprises a tube 11 forming a chamber for pressurized ink, a plate 12 secured across the end of the supply tube, an orifice 13 in this plate through which a stream or filament 14 of ink issues, and a radially contracting and expanding transducer 15 surrounding tube 11 and orifice plate 12. Orifice plate 12 is preferably a material having a high modulus of elasticity and which is chemically inert to the ink, such as glass or stainless steel. The plate can be attached to tube 11 by known techniques, such as glass frit or solder.

Transducer 15 is shown as a cylindrical piezoelectric crystal concentrically mounted about tube 11 and orifice plate 12 and has conductive material, such as an electroless nickel plating or silver coating on both the inner and outer surfaces 16 and 17. The transducer and tube should fit snugly and attachement can be made to plate 12 and, if desired, also to tube 11 by solder or other suitable means. The two surfaces of the crystal 15 are then connected to the output terminals of a conventional signal generator. Preferably inner surface 16 in contact with orifice plate 12 is attached to ground to maintain the ink at ground potential, while surface 17 is connected to the output terminal of the signal generator.

In operation, pressurized liquid ink is delivered to tube 11 so that filament 14 issues through orifice 13 which, in ink jet printing, will have a diameter from approximately 0.02 mm to 0.07 mm. The stream will by nature ramdonly break into drops at irregular distances from the orifice. Therefore, it is highly desirable to produce perturbations in the ink jet stream to vary its cross-section at specific intervals to thereby induce regular breakup of the stream into uniform drops at a constant distance from the orifice. These perturbations are induced by energizing signal generator 18 which results in cyclical contraction and expansion of the annual crystal surrounding the orifice plate. Crystal 15 is able to cause correspondingly minute reductions and expansions in the cross-sectional dimensions of the orifice which, in turn, create small changes in the rate of ink flow through the orifice. The changes in rate of ink flow causes changes in the cross-sections of the ink stream at the periodic locations along the filament which thus induce the stream to form droplets at a predetermined distance from the orifice. Signal amplitude controls the distance from the orifice at which drops form.

The upper limit of the frequency at which the orifice can be modulated is determined by the relationship:

$$f < V/L$$

where $f$ is the applied frequency, $v$ is the ink stream velocity, and $L$ is the orifice length. This relationship insures that the envelope of the issuing ink stream will show variation in cross-section during its travel from the beginning to the end of the orifice length. Otherwise, the issuing ink stream will be maintained at its minimum cross-section with no effective perturbations. As an example, where ink is supplied to tube 11 at a pressure of 2.04 atmospheres, an ink velocity of 14.86 meters per second results, and, for a nozzle of 0.076 mm in length, an upper limit of frequency of approximately 195 KHz. will result.

The shape of orifice 13 is not of particular import. In other words, the orifice may be noncircular, such as rectangular, square or elliptical since the free stream will resume a configuration of minimum surface. It is desirable, however, that the stresses applied to change the cross-section of the orifice be radially symmetric, since to do otherwise causes the issuing stream to divert from the longitudinal axis of the orifice and create an aiming problem.

Figure 2A:
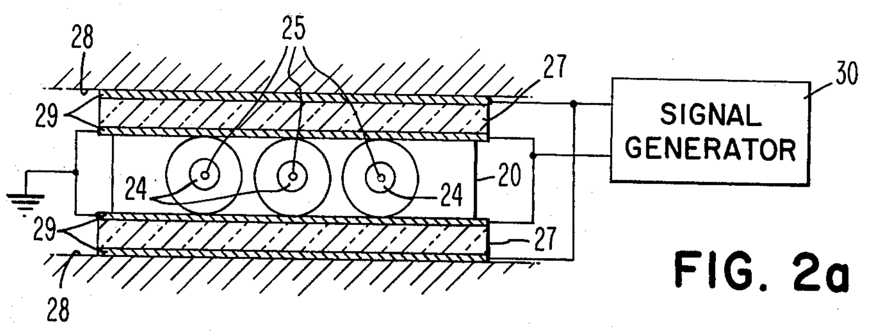
FIGS. 2*a* and 2*b* are front elevation and plan sectional views, respectively, of a multi-orifice nozzle constructed in accordance with the invention.
Figure 2B:
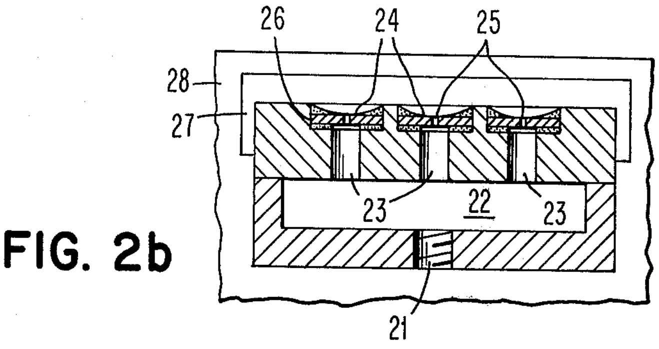

FIGS. 2a and 2b illustrate an embodiment of the invention in which a linear array of nozzles are arranged to be simultaneously acted upon to create concurrent perturbations in each of the issuing streams. A nozzle block 20 is formed with ink supply port 21, supply manifold 22 and a plurality of ducts 23, each terminated by orifice plate 24 having circular orifice 25 therein. Orifice plates 24 can be secured in counterbores 26 in nozzle block 20 by solder or glass frit. Nozzle block 20 is supported between two planar transducers, such as piezoelectric crystals 27 that are, in turn, mounted between fixed frame members 28. Each crystal 27 is coated with conductive layers 29 on opposite sides thereof. The two conductive layers adjacent nozzle block 20 are connected to the ground terminal of signal generator 30, and the two outer conductive layers 29 are connected to the output signal terminal of the generator and are insulated from frame members 28.

In operation, pressurized ink is supplied to manifold 22 and ducts 23 to issue as fluid filaments from each of the orifices 25 in plates 24. Upon activation of signal generator 30, the voltages across electrodes 29 for each crystal 27 causes the crystals to expand and contract and stress orifice plates 24. This causes orifices 25 and the plates 24 to momentarily contract and become elliptical to thereby slow the flow rate and produce perturbations in the issuing liquid filaments. The simultaneous stressing of a plurality of orifices by commonly activated transducers results in the concurrent creation of perturbations and drop formation in the several issuing streams at approximately the same distances. This capability is especially desirable in attempting to maintain synchronism in ink drop generation, which has heretofore required the incorporation of complex phase control circuits for pressure or velocity modulation devices.

Figure 3A:
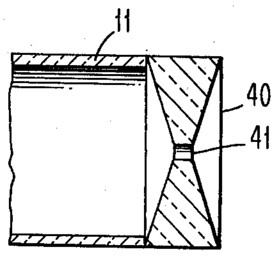
FIGS. 3*a* and 3*b* are sectional views of modifications of orifice plates that may be used with the embodiments of the invention shown in FIGS. 1, 2a and 2b.
Figure 3B:
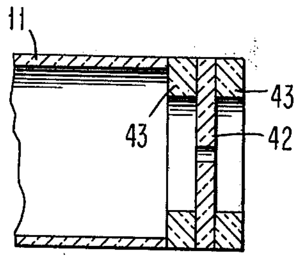

FIGS. 3a and 3b show other orifice plate configurations that may be used. In each of these the thickness of the center portion of the orifice plates is reduced relative to the outer portion to permit greater dimensional change of the orifice during modulation. In FIG. 3*a*, orifice plate 40 is tapered toward the orifice 41. In FIG. 3*b*, the plate 42 is joined with a pair of toroids 43, preferbly of the same material, on opposite sides.

Another modification of simple construction is to form a supply manifold and orifices directly in a block of piezoelectric material. The crystal is supported between fixed frame members, as shown in FIGS. 2*a* and 2*b* and may be activated by attaching two similar signal generators to opposite surfaces of the crystal and driving the generators 180° out of phase with each other. This arrangement is more suitable for modulating large orifices since the accuracy in orifice size required for ink jet orifices is difficult to attain in the crystal material.

While the invention has been particularly shown and described with reference to preferred embodiments thereof, it will be understood by those skilled in the art that the foregoing and other changes in form and details may be made therein without departing from the spirit and scope of the invention.

What is claimed is:

1. The method of producing perturbations in an ink jet stream to cause breakup of said stream into successive drops comprising the steps of:

forcing said liquid through an orifice in a wall of a chamber; and repetitively altering the configuration of the cross-section of said orifice in said wall with only radial forces to avoid standing waves and to produce changes in the flow rate of said stream.

2. The method of producing perturbations in an ink jet stream to cause breakup of said stream into successive drops comprising the steps of:

forcing said liquid through an orifice in a wall of a chamber; and repetitively stressing said wall with only radial forces to avoid standing waves and to alter the cross-section of said orifice to product corresponding alternations in the cross-section of said stream.

3. The method as described in claim 2 wherein said repetitive stressing is applied so as to produce contraction of said orifice cross-section.

4. The method as described in claim 2 wherein said wall containing said orifice is only radially stressed by a stressing means mounted exteriorly of said chamber with a substantial portion of the surface area of said stressing means surrounding said wall.

5. An ink jet nozzle for perturbing a liquid stream to induce controlled breakup of the stream into drops comprising:

a chamber to which liquid under pressure is supplied, said chamber including a wall having an orifice therein through which said pressurized liquid is forced in the form of a stream; and means surrounding said wall for repetitively stressing said wall with only radial forces to avoid standing waves and to vary the cross-section of said orifice and produce perturbations in the cross-section of said stream.

6. Apparatus as described in claim 5 wherein said stressing means produces cyclical contraction and expansion of said orifice.

7. Apparatus as described in claim 5 wherein said stressing means applies diametrically opposing forces to said wall to produce variations in said orifice cross-section.

8. Apparatus as described in claim 5 wherein said chamber wall is circular and said stressing means surrounds said chamber wall and said orifice.

9. Apparatus as described in claim 5 wherein said stressing means includes piezoelectric cystals and signal generating means for causing cyclical contraction and expansion of said crystals.

10. Apparatus as described in claim 5 wherein the thickness of said wall is nonuniform at least adjacent said orifice and greatest in the proximity of said stressing means to permit greater dimensional change of the orifice during stressing.

11. An ink jet jozzle for perturbing a liquid stream to induce controlled breakup of the stream into drops comprising:

a chamber to which liquid under pressure is supplied, said chamber including a plurality of ducts, each terminated by a plate having an orifice therein through which said pressurized liquid is forced in the form of streams; and means adjacent to said plates for repetitively stressing said plates with only radial forces to avoid standing waves and to vary the cross-sections of said orifices to produce concurrent perturbations in the issuing streams and, thus, maintain synchronism in the drop generation.

12. Apparatus as described in claim 11 wherein said orifices are linearly arranged and said stressing means includes a pair of parallel piezoelectric crystals for producing counteracting, diametrically opposed forces on said plate.

* * * * *

UNITED STATES PATENT AND TRADEMARK OFFICE

CERTIFICATE OF CORRECTION

PATENT NO. : 3,958,249

DATED : May 18, 1976

INVENTOR(S) : Frank J. DeMaine; Robert E. Pelkie, Normand C. Smith and Reinhold E. Tomek It is certified that error appears in the above-identified patent and that said Letters Patent are hereby corrected as shown below:

Claim 2, Col. 4, Line 60 "product" should read --produce--.
Claim 2, Col. 4, Line 61 "alternations" should read --alterations--.
Claim 9, Col. 5, line 27, "cystals" should read --crystals--.
Claim 11, Col. 6, line 8, "jozzle" should read --nozzle--.

Signed and Sealed this

Seventh Day of December 1976

[SEAL]

*Attest:*

RUTH C. MASON
*Attesting Officer*

C. MARSHALL DANN
*Commissioner of Patents and Trademarks*